United States Patent [19]

Bauer

[11] Patent Number: 4,829,218
[45] Date of Patent: May 9, 1989

[54] DIRECT CURRENT ADJUSTING DEVICE

[75] Inventor: Alfred Bauer, Neu-Isenburg, Fed. Rep. of Germany

[73] Assignee: Braun Aktiengesellschaft, Kronberg, Fed. Rep. of Germany

[21] Appl. No.: 129,475

[22] Filed: Dec. 7, 1987

[30] Foreign Application Priority Data

Dec. 18, 1986 [DE] Fed. Rep. of Germany ....... 3643221

[51] Int. Cl.$^4$ .............................................. H02P 5/00
[52] U.S. Cl. .................................. 388/811; 388/900; 388/903; 388/910; 388/934
[58] Field of Search ................... 318/341, 345 E, 331, 318/327, 317, 345 F, 334

[56] References Cited

U.S. PATENT DOCUMENTS

| | | | |
|---|---|---|---|
| 3,560,828 | 2/1971 | Kobayashi et al. | 318/345 F |
| 4,211,961 | 7/1980 | Marumoto et al. | 318/341 X |
| 4,218,641 | 8/1980 | Arnold et al. | 318/327 X |
| 4,325,011 | 4/1982 | Peterson | 318/34 X |
| 4,458,186 | 7/1984 | Kuriyama et al. | 318/345 X |
| 4,547,715 | 10/1985 | Li | 318/345 F |

FOREIGN PATENT DOCUMENTS

| | | |
|---|---|---|
| 2100929 | 7/1972 | Fed. Rep. of Germany . |
| 2166360 | 4/1976 | Fed. Rep. of Germany . |
| 3437610 | 4/1986 | Fed. Rep. of Germany . |
| 1142124 | 2/1969 | United Kingdom . |

OTHER PUBLICATIONS

Elektronik, "Verbesserte Strombegrenzung fur Leistungstransistoren", 11/30.5, 1986, pp. 118–120.
Elektronik, "600-W-Motorsteuerung fur Netzbetrieb mit hoher Schaltfrequenz", 1978, pp. 61–65.

*Primary Examiner*—Benjamin Dobeck

[57] ABSTRACT

A control circuit for adjusting current to a direct current motor that has a free wheeling diode connected in parallel with the armature winding includes a controllable switching element connected in series with the armature winding, a comparator that has a control voltage corresponding to a desired rotational speed of the motor applied to one input of the comparator and an integrating circuit connected to the other input of the comparator. An electronic switch is connected across the integrating circuit, and the output of the comparator controls the controllable switching element and the electronic switch.

11 Claims, 4 Drawing Sheets

DIRECT CURRENT ADJUSTING DEVICE

DESCRIPTION

This invention relates to a direct current adjusting device with a free-wheeling diode which is connected in parallel with the armature winding of a direct current motor and with a controllable switching element which is connected in series with the armature winding of the direct current motor and a direct current voltage source, the control terminal of the switching element being connected to the output of a pulse duration modulator comprising a desired value generator for the rotational speed of the direct current motor.

From the magazine "Elektronik", 1978, Heft 3, pages 61 to 65, a circuit configuration for controlling the rotational speed of a DC motor is known in which the armature circuit of the DC motor is connected via a DC adjuster to the DC voltage terminals of a bridge rectifier connected to an AC supply. The DC adjuster comprises a controllable semiconductor switch connected in series with the armature winding of the DC motor and the DC voltage terminals of the bridge rectifier. A free-wheeling diode is connected in parallel with the armature winding of the DC motor. The control terminal of the controllable semiconductor switch is connected to a control circuitry including a driver stage and an oscillator and pulse duration modulator which are connected to a control voltage source. The desired speed of the DC motor can be predetermined by means of a pulse duration adjuster.

In operation, the controllable semiconductor switch of the DC adjuster applies the rectified AC voltage in rapid succession to the armature terminals of the DC motor, with the armature current flowing through the controllable semiconductor switch during its turn-on period, whereas the armature current flows through the free-wheeling diode during the off period of the controllable semiconductor switch. By changing the pulse duty factor, that is, the ratio of the average pulse duration to the average pulse spacing, it is possible to vary the duration of armature current flow so that the DC motor can be set to nearly any desired speed. The pulse duration modulation executed by the control circuit for controlling the controllable semiconductor switch makes use of a constant pulse spacing and thus of a constant frequency. For this purpose, a comparator compares a delta voltage or saw-tooth voltage of constant amplitude and constant frequency with a constant control voltage providing the desired value for the pulse duty factor. Thus, the comparator output signal depends on the magnitude of the control voltage, enabling the pulse duration of the output signal to be modulated correspondingly.

Since, for controlling the rotational speed of a DC motor using a DC adjuster with pulse duration modulation, magnitude and time fluctuations of the DC voltage cause fluctuations of the armature current of the DC motor, considerable fluctuations of armature current occur in the presence of DC ripple voltage which the control circuitry for controlling the controllable semiconductor switch of the DC adjuster is not capable of compensating for without additional measures and which cause a marked increase in load losses in the armature of the motor. Such fluctuations of armature current are the higher the less the DC voltage conventionally derived from a rectified single-phase AC supply is smoothed. Suitable filters for smoothing and filtering the DC ripple voltage are, however, complex, expensive and require considerable space.

It is an object of the present invention to provide a DC adjuster for a DC motor which is of simple construction, ensures a reliable operation of the DC motor, avoids overloads of the DC motor and ensures that the arithmetic mean of the voltage residing at the DC motor is not dependent on the magnitude or the time fluctuations of the DC voltage lying at the DC adjuster but depends solely on the control voltage of the control circuitry for the DC adjuster, which control voltage determines the desired speed, and which eliminates the need for complex smoothing and filtering devices.

These requirements are satisfied by the characterizing feature of patent claim 1 of the invention.

In addition to ensuring a reliable operation and avoiding overload conditions of the DC motor while permitting a simple construction of the DC adjuster, the solution of the invention provides an extremely uniform armature current of the DC motor, because the arithmetic mean of the voltage residing at the DC motor does not depend on magnitude or fluctuations of the DC voltage lying at the DC motor and the DC adjuster, but depends solely on the control voltage predetermining the desired speed in the control circuitry for controlling the DC adjuster.

In accordance with an advantageous embodiment of the solution of the invention, the signal applied to the control terminal of the electronic switch may be drawn from both the control terminal of the controllable switching element or the output of the comparator with hysteresis and the output of the controllable switching element, with the last-mentioned embodiment taking into account the time displacements attributable to the switching and storage times of the controllable switching element.

A further advantageous embodiment of the solution of the invention is characterized in that the DC voltage can be tapped at a voltage divider connected in parallel with the DC voltage source and comprised of two voltage dividing resistors in series arrangement, and that the switching circuit of the electronic switch is connected in parallel with the first voltage dividing resistor and the integrating element is connected to the junction of the two voltage dividing resistors.

In this embodiment of the solution of the invention, it is not the full DC voltage lying at the DC adjuster and DC motor that is applied through the electronic switch to the integrating element and to the input of the comparator with hysteresis, but, by means of the voltage divider, only that portion which corresponds to the quotient of the resistance parallel to the switching circuit of the electronic switch by the total resistance of the voltage divider. As a result, the voltage thresholds of the comparator with hysteresis are reduced by the factor corresponding to this quotient. This reduction of voltage thresholds provides the possibility of using monolithic integrated comparators or Schmitt-Triggers.

For performing a current limiting function, a still further advantageous embodiment of the solution of the invention provides for the control terminal of the controllable switching element to be further connected to the output of a second two-step controller including a second comparator with hysteresis which has applied to its noninverting input a second control voltage and the inverting input of which is connected, via an RC element, to the junction of a load terminal of the controllable switching element and a lead of a measuring resistor having its other lead connected to the DC voltage source.

This solution provides a simple and fast current limiting function serving to protect the controllable switching element and the DC motor against overload.

The idea underlying the invention shall be explained in more detail in the following with reference to an embodiment illustrated in the drawings. In the drawings, FIGS. 1 and 2 are circuit diagrams of a DC adjuster for a DC motor;

Figure 1:
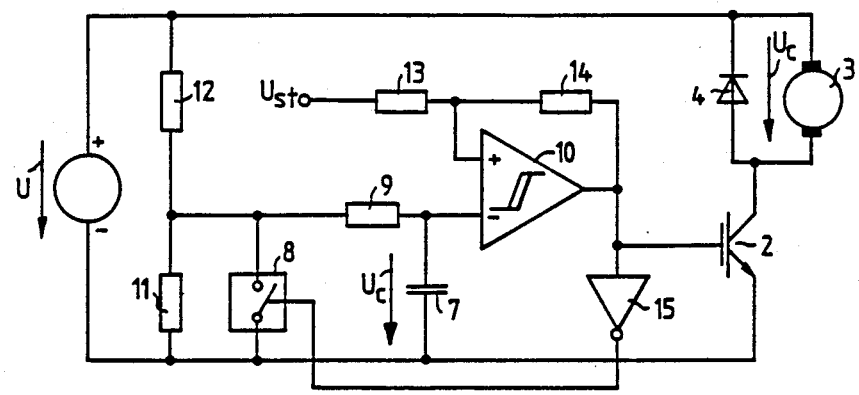

In FIG. 1, the circuit configuration for controlling the rotational speed of a DC motor 3 shows a controllable switching element 2 in the form of a power conductivity-modulated field-effect transistor (COMFET) connected in series with the armature winding of the DC motor 3, as well as a free-wheeling diode 4 connected in parallel with the armature winding of the DC motor 3 and being of opposite polarity to the direction of flow of the armature current.

A DC voltage source U which is conventionally comprised of the DC voltage terminals of a bridge rectifier connected to a single-phase AC voltage source serves to supply current to both the DC motor 3 and a control circuitry for controlling the controllable switching element 2.

The control circuitry comprises a first comparator with hysteresis 10 or Schmitt-Trigger having a control voltage $U_{st}$ applied to its non-inverting input through a resistor 13. In addition, the non-inverting input of the Schmitt-Trigger 10 is connected to its output through a resistor 14. The inverting input of the Schmitt-Trigger 10 is connected to the junction of an integrating resistor 9 and an integrating capacitor 7 which combine to form an integrating element. The other lead of the integrating resistor 9 is connected to the junction of two voltage dividing resistors 11, 12 forming a voltage divider connected in parallel with the DC voltage source U. The other lead of the integrating capacitor 7 is directly connected to the negative terminal of the DC voltage source U.

Connected in parallel with the first voltage dividing resistor 11 is the switching circuit of an electronic switch 8 which has its control terminal connected to the output of the first comparator with hysteresis or Schmitt-Trigger 10 via an inverter 15. In addition, the output of the Schmitt-Trigger 10 is directly connected to the control terminal of the controllable switching element 2.

Figure 2:
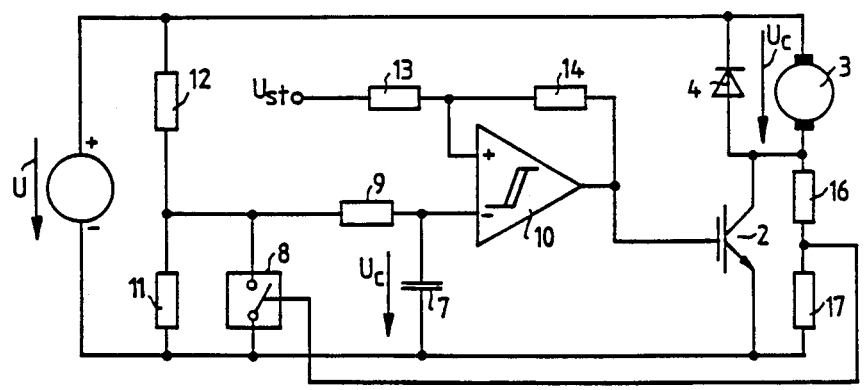

In a second version illustrated in FIG. 2 and basically identical with the circuit configuration of FIG. 1, the control terminal of the electronic semiconductor switch 8 is not connected to the output of the Schmitt-Trigger 10 via the inverter 15 but to the junction of two series-connected resistors 16, 17 connected in parallel with the switching circuit of the controllable switching element 2.

The mode of operation of the circuit configuration of FIG. 1 will be explained in more detail in the following.

By analogy with the above-described function of a DC adjuster for controlling the rotational speed of a DC motor, the armature winding of the DC motor 3 is connected to and disconnected from the DC voltage source U in rapid succession by means of the controllable switching element 2. In this arrangement, the armature current flows alternately through the switching circuit of the controllable switching element 2 when the controllable switching element 2 is on or through the free-wheeling diode 4 connected in parallel with the armature winding when the controllable switching element 2 is turned off Control of the controllable switching element 2 is effected by means of the control circuitry described above, the embodiment described using a fast two-step control in which the partial voltage of the DC voltage source U tapped from the voltage divider 11, 12 is applied to the integrating element 7, 9 through the electronic semiconductor switch 8 the time constant of which corresponds approximately to the time constant of the DC motor determined by the quotient of the armature inductance by the armature resistance. The two-step controller is formed by the integrating element 7, 9, the first comparator with hysteresis or Schmitt-Trigger 10 and the electronic semiconductor switch 8.

To cause the arithmetic mean of the voltage lying at the DC motor 3 to assume a desired value by means of the fast two-step controller 7, 9, 10, the full voltage lying at the DC motor 3 or the partial voltage divided by the voltage divider 11, 12 has to be present at the input of the two-step controller Considering, however, that the motor voltage does not refer to the reference potential of the two-step controller (negative terminal of the DC voltage source U) but to the positive terminal, the voltage residing at the DC motor 3 has to be reproduced by means semiconductor switch 8.

When the controllable switching element 2 conducts, the DC voltage U lies at the DC motor 3, while the DC voltage divided down by means of the voltage divider 11, 12 lies at the input of the two-step controller or integrating element 7, 9.

When the controllable switching element 2 does not conduct, the DC voltage U does not reside at the DC motor 3. To ensure that the DC voltage divided down by the voltage divider 11, 12 does not reside at the input of the two-step controller either, it is short-circuited by placing the electronic semiconductor switch 8 which is connected across the lower voltage dividing resistor 11 in its conductive state. Thus, the divided motor voltage is present at the input of the two-step controller, that is, with the electronic semiconductor switch 8 open, the partial voltage of the DC voltage source U lies at the integrating resistor 9, whereas in the closed condition of the electronic semiconductor switch 8, negative or ground potential lies at the integrating resistor 9.

The integrated partial voltage $U_c$ of the motor which thus lies at the inverting input of the first comparator with hysteresis or Schmitt-Trigger 10 is compared in the comparator with hysteresis or Schmitt-Trigger with a control voltage $U_{st}$ which is representative of the desired value of the motor voltage or its desired rotational speed. In dependence on this comparison, a corresponding control signal is present or not at the output of the first Schmitt-Trigger 10, accordingly controlling the controllable switching element 2 or, through the inverter 15, the controllable semiconductor switch 8.

As a result of the feedback of the output of the Schmitt-Trigger 10 to the control terminal of the controllable semiconductor switch 8, a pulse-shaped voltage lies at the input of the integrating element 7, 9, the arithmetic mean of which corresponds to the control voltage $U_{st}$. Since the controllable switching element 2 is likewise controlled by the output signal of the Schmitt-Trigger 10, the voltage $U_c$ residing at the DC motor 3, while corresponding to this pulse-shaped voltage, is greater by the voltage divider ratio $$\frac{R_{11} + R_{12}}{R_{11}}$$

In this manner, the DC motor 3 acts as if it operated on a pure DC voltage the value of which corresponds to the arithmetic mean of the motor voltage $U_M$. As a result, the circuit configuration of the invention is largely independent of fluctuations or ripple of the input voltage source, and the motor voltage or rotational speed of the DC motor 3 depends almost exclusively on the magnitude of the control voltage $U_{st}$.

The mode of operation of the circuit configuration of FIG. 2 corresponds substantially to the mode of operation of the circuit configuration of FIG. 1, the difference being that control of the controllable semiconductor switch 8 is dependent on the voltage residing at the switching circuit of the controllable switching element 2 which is tapped through the resistors 16, 17. Switching delays and storage times of the controllable switching element 2 are thereby taken into account, and an even more uniform control of the rotational speed of the DC motor 3 is accomplished.

Figure 3:
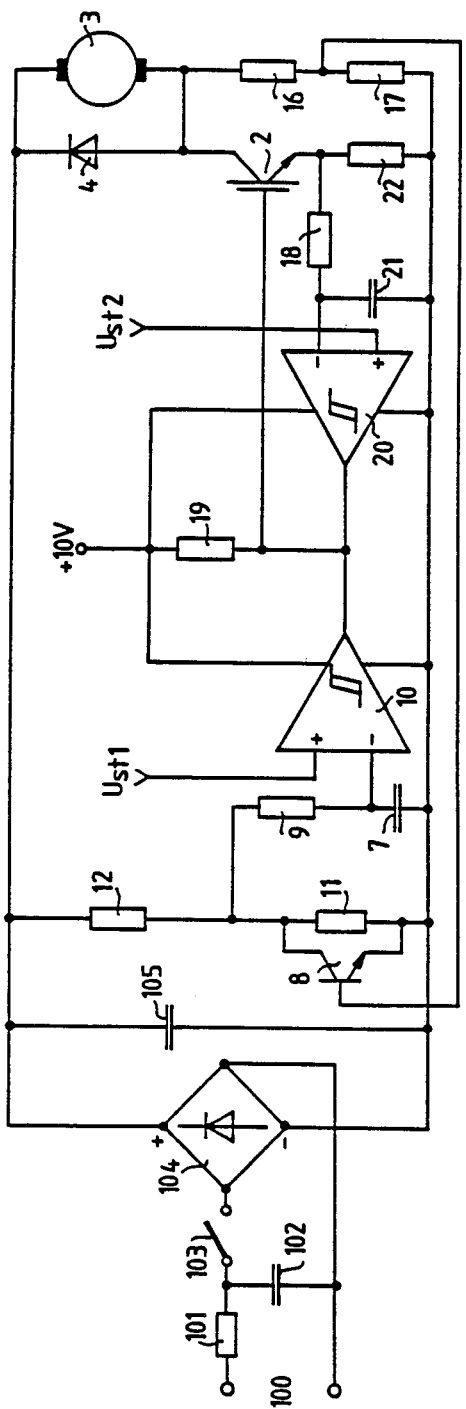
FIG. 3 is a circuit diagram according to FIG. 2 including additional circuitry for limiting the armature current of the DC motor.

In FIG. 3, the DC adjuster for a DC motor with additional overcurrent limiting function includes, by analogy with the circuit configuration of FIGS. 1 and 2, a controllable switching element 2 connected in series with the armature winding of a DC motor 3, as well as a free-wheeling diode 4 connected in parallel with the armature winding of the DC motor 3. The input circuitry shown in this circuit configuration in detail which serves to supply voltage to the DC motor 3 and to the control circuitry for controlling the controllable switching element 2 includes a single-phase AC supply 100, a series resistor 101, a parallel capacitor 102, a switch 103 and a bridge rectifier 104 having a smoothing capacitor 105 connected in parallel with the DC voltage terminals.

By analogy with the circuit configuration of FIGS. 1 and 2, the control circuitry for controlling the controllable switching element 2 includes a first fast two-step controller comprised of a first comparator with hysteresis or Schmitt-Trigger 10, an integrating element 7, 9 and a controllable semiconductor switch 8. The switching circuit of the controllable semiconductor switch 8 represented as a transistor in this embodiment is connected in parallel with a first voltage dividing resistor 11 which, in conjunction with a second voltage dividing resistor 12, is connected in parallel with the smoothing capacitor 105, forming a voltage divider.

The integrating resistor 9 has its one lead connected to the junction of the two voltage dividing resistors 11, 12 and its other lead to the inverting input of the first comparator with hysteresis or Schmitt-Trigger 10 and to one lead of the integrating capacitor 7 which has its other lead connected to the negative DC voltage terminal or ground potential.

The first comparator with hysteresis or Schmitt-Trigger 10 has applied to its non-inverting input a first control voltage $U_{st1}$ which is conventionally tapped through a potentiometer from a constant DC voltage source provided by a stabilizing circuitry connected to the smoothing capacitor 105. Voltage supply to the Schmitt-Trigger 10 is likewise from a stabilized DC voltage source of, for example, +10 volts.

In addition to the control circuitry corresponding to the circuit configurations of FIGS. 1 and 2, a second fast two-step controller is provided which is comprised of a second comparator with hysteresis or Schmitt-Trigger 20, an RC element 18, 21 connected to the inverting input of the Schmitt-Trigger 20, and a measuring resistor 22 connected in series with the armature winding of the DC motor 3 and with the load circuit of the controllable switching element 2. A second control voltage $U_{st2}$ is applied to the non-inverting input of the second Schmitt-Trigger 20.

By analogy with the circuitry of FIG. 2, the control terminal of the controllable semiconductor switch 8 is connected to the junction of two resistors 16, 17 connected in parallel with the switching circuit of the controllable switching element 2 and the measuring resistor 22.

The outputs of the two comparators with hysteresis or Schmitt-Triggers 10, 20 are connected to each other directly and to the control terminal of the controllable switching element 2 as well as to the stabilized voltage source of +10 volts through an external resistor 19.

The mode of operation of the circuit configuration of FIG. 3 shall be explained in more detail in the following with reference to the rotational speed versus torque diagram of a permanent magnet DC motor shown in FIG. 4.

The mode of operation of the first fast two-step controller incorporating the Schmitt-Trigger 10, the integrating element 7, 9 and the electronic switch 8 is identical with the mode of operation of the circuitry explained with reference to FIGS. 1 and 2. However, by means of the second fast two-step controller the arithmetic mean $I_{av}$ of the current is limited by the controllable switching element 2 to a maximum value, with the resulting motor current $I_M$ being dependent on the rotational speed of the motor and other constant quantities of the DC motor 3.

The current flowing through the controllable switching element 2 produces in the measuring resistor 22 a measuring voltage which is integrated in the RC element 18, 21 and passed to the inverting input of the second comparator with hysteresis 20. Since the control voltage $U_{st2}$ determining the maximum value of the current is present at the noninverting input of the second comparator with hysteresis 20, a condition in which the current flowing through the controllable switching element 2 exceeds the maximum value will activate the output of the comparator with hysteresis 20, the output determining the control of the controllable switching element 2, since both outputs of the comparators 10, 20 are of the open collector type in relation to the external resistor 19 whereby a wired OR function is accomplished.

Neglecting the on-state losses in the controllable switching element 2 and in the free-wheeling diode 4, the dependence of the motor current $I_M$ on the arithmetic mean of the current $I_{av}$ flowing through the controllable switching element 2 is reflected by the following relationship:

$$I_M = \frac{U}{U_m} \cdot I_{av}$$

where U is the supply voltage delivered by the DC voltage source and $U_M$ is the arithmetic mean of the voltage at the DC motor 3.

With the current limiting function setting in, the following equation results for the motor speed n:

$$n = K \left( U \cdot \frac{I_{av}}{I_M} - I_M \cdot R_a \right)$$

where $R_a$ is the armature resistance of the DC motor 3 and K is a constant depending on the motor data. From this equation results the rotational speed characteristic shown in FIG. 4 in broken lines as the current limiting function sets in.

Because the voltage at resistor 22 which is proportional to the current through the electronic switch 2 is applied to the input of the second two-step controller 18, 20, 21, 22, the second two-step controller 18, 20, 21, 22 maintains the arithmetic mean of the current flowing through the electronic switch 2 constant, and not the arithmetic mean of the motor current. This is particularly desirable in drive systems for kitchen appliances. When control is transferred from the first two-step controller 7, 8, 9, 10 to the second two-step controller 18, 20, 21, 22, this causes the electrical power supplied to the DC motor 3 to be maintained constant.

Figure 4:
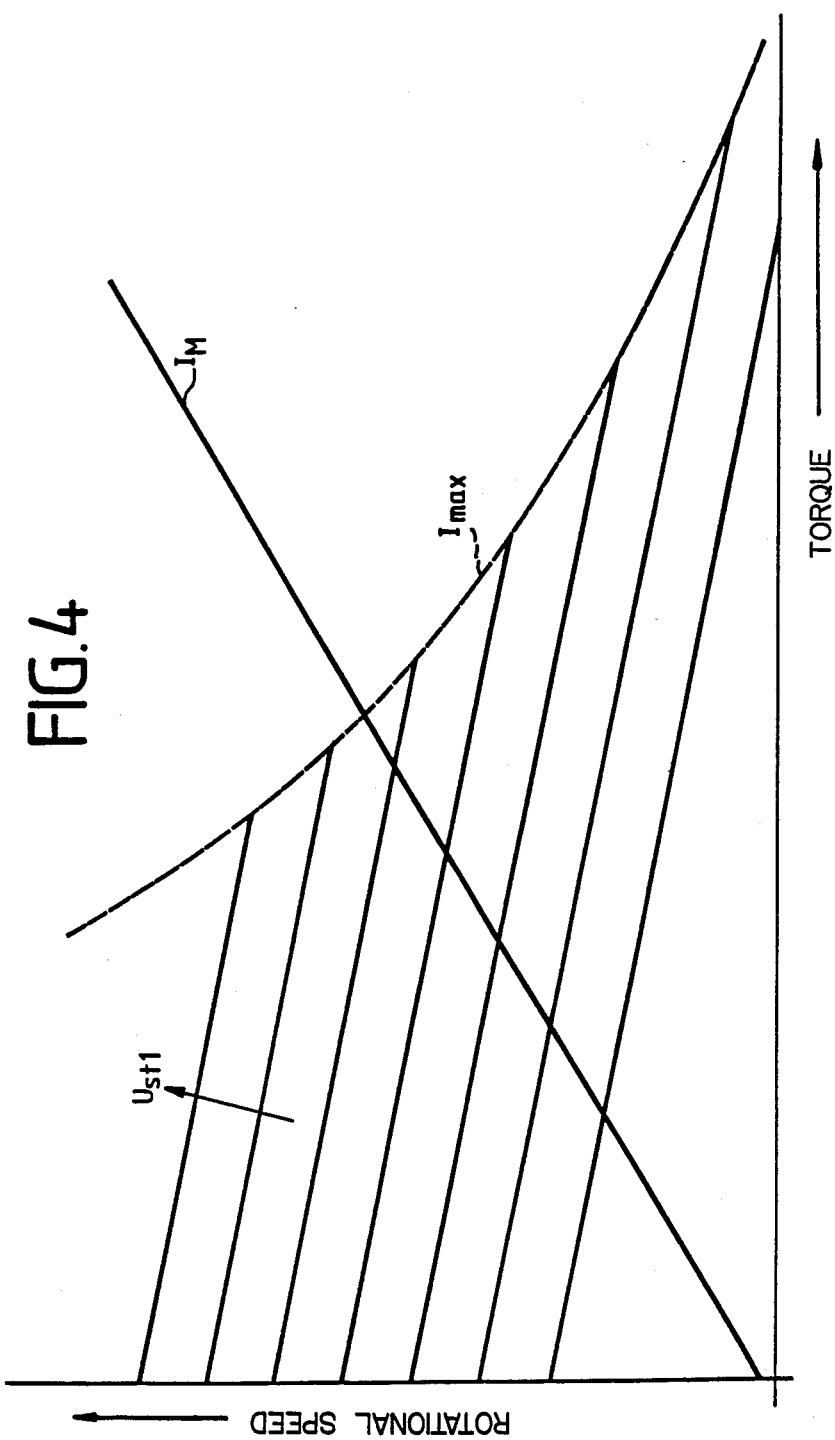
FIG. 4 is a graph showing the rotational speed plotted against the torque when using a circuit configuration according to FIG. 3.

FIG. 4 shows various speed versus torque characeristics, the parameter being the control voltage $U_{st1}$ at the non-inverting input of the first comparator with hysteresis 10. As the current limiting function sets in, the characteristic curves drawn in full and depending on the first control voltage $U_{st1}$ become the characteristic curve shown in broken lines due to the control of the arithmetic mean of the motor voltage when the maximum current is exceeded. This characteristic which is referred to as a safety characteristic is advantageously chosen such that the motor current resulting with the DC motor 3 at standstill is just short of causing demagnetization of the permanent magnets.

It is a substantial advantage of the current limiting function described that it results in significantly lower motor current values at higher rotational speeds which benefits the commutation of the DC motor and thus the brush life.

Figure 5:
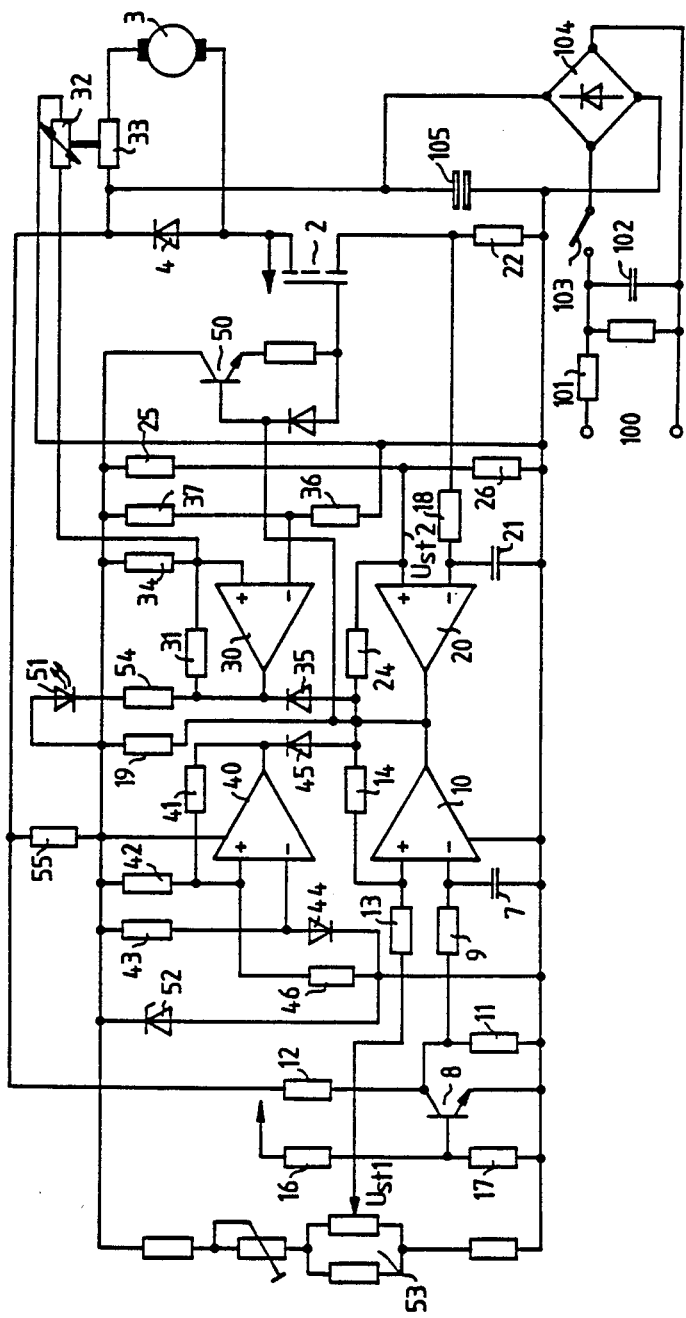
FIG. 5 is a detailed circuit diagram of a DC adjuster of FIGS. 1 to 3 providing additional overtemperature protection and operating voltage monitoring functions for protecting the DC motor.

The complete circuit diagram of a DC adjuster as shown in FIG. 5 includes a rectifier input circuitry as well as a control circuitry, comprising the two comparators with hysteresis 10, 20, for the controllable switching element 2, their configuration and function corresponding to the embodiments previously described, where like reference numerals identify like circuit elements.

In the embodiment of FIG. 5, the control voltage of the first comparator with hysteresis 10 is adjusted at a voltage divider by means of a potentiometer 53, whereas the control voltage of the second comparator with hysteresis 20 is tapped from a voltage divider comprised of two series-connected resistors 25, 26 which are connected to the DC voltage source. The operating voltage of the DC adjuster is tapped through a resistor 55 from the DC voltage lying at the smoothing capacitor 105. In addition, a Zener diode 52 is provided which likewise serves to adjust the operating voltage for supplying the comparator circuits with current, to generate the control voltages, and to operate an emitter follower 50 serving to control the controllable switching element 2.

Additional components of the DC adjuster illustrated in FIG. 5 include to further comparators with hysteresis 30, 40 which, respectively, serve to turn off the motor should an overtemperature condition occur and to monitor the operating voltage of the electronic control system of the electronic DC adjuster.

The electronic overtemperature protection serves to turn off the DC motor 3 before the copper wire of the armature winding has reached a maximum temperature of, for example, 120° C. Since the rotating armature winding is not readily accessible to measurement by a sensor, the heat developing in the armature winding is reproduced at another place by providing a low-resistance current-detecting resistor 33 of suitable size and rating through which the armature current heating the armature wire flows, thus likewise heating the low-resistance current-detecting resistor 33.

The temperature developing at the current-detecting resistor 33 is sensed by means of an NTC resistor 32 which is in thermal contact with the current-detecting resistor 33 and is connected to the noninverting input of a third comparator with hysteresis 30. The other lead of the NTC resistor 32 is connected to reference potential.

In addition, the noninverting input of the third comparator with hysteresis 30 is connected to the positive terminal of the input voltage through a resistor 34 and to its output through a further resistor 31. The output of the third comparator with hysteresis 30 is further connected to the cathode of a diode 35 having its anode connected to the junction of the outputs of the first two comparators with hysteresis 10, 20. The inverting input of the third comparator with hysteresis 30 is connected to a voltage divider 36, 37 to which the input voltage is applied.

On an increase in temperature of the current-detecting resistor 33 and thus of the armature winding of the DC motor 3, the resistance of the NTC resistor 32 decreases. When the resistance drops below a predetermined value, the third comparator with hysteresis 30 will switch to low potential at its output, pulling also the outputs of the first and second comparator with hysteresis 10, 20 to low potential through the diode 35. This holds the controllable switching element 2 in the off state via the control circuitry 50 so that armature current does not flow causing the DC motor 3 to be turned off.

With the output potential of the third comparator with hysteresis 30 changing to low potential, a current flows through resistor 54 and the light emitting diode 51, causing it to light. This indicates that the motor was turned off because of overheating.

On account of the interruption of armature current, the current-detecting resistor 33 cools off slowly, so that the resistance of the thermally coupled NTC resistor 32 increases until a predetermined value is reached causing the output of the third comparator with hysteresis 30 to switch again to high potential, whereupon the outputs of the first two comparators with hysteresis 10, 20 become active again and control the controllable switching element in the manner previously described with reference to FIGS. 1 to 3, so that the DC motor 3 is turned on again.

To monitor the operating voltage of the electronic control system of the DC adjuster, a fourth comparator with hysteresis 40 is used which is to ensure that current does not flow through the controllable switching element 2 when the DC adjuster is turned on until the operating voltage of the electronic control system which, for example, is rated at 15 volts, has reached a minimum of about 10 volts, thereby eliminating the risk of thermal overload of the controllable switching element 2.

For monitoring the operating voltage, the noninverting input of the fourth comparator with hysteresis 40 is connected to a voltage divider 42, 46, while the inverting input of the fourth comparator with hysteresis 40 is connected to the anode of a diode 44 and to a resistor 43 connected to the positive terminal of the input voltage. The diode 44 has its cathode connected to the reference voltage. In addition, the noninverting input of the fourth comparator with hysteresis 40 is connected to its output through a further resistor 41, the output being further connected to the cathode of a diode 45 having its anode connected to the outputs of the first two comparators with hysteresis 10, 20.

The operating voltage lying at the electronic control system of the DC adjuster, after being divided by the voltage divider 42, 46, is applied to the noninverting input of the fourth comparator with hysteresis 40, while the inverting input receives a reference voltage the forward voltage of the diode 44 through which a cross current flows which is adjustable by means of the resistor 43. If, on turning on the DC adjuster, the voltage at the noninverting input of the fourth comparator with hysteresis 40 exceeds the voltage at the inverting input, which voltage corresponds to the forward voltage of the diode 44, by a predetermined amount, the output of the fourth comparator with hysteresis 40 will switch to high potential, thereby releasing the functions of the other comparators 10, 20, 30. This is the case when the operating voltage has reached the minimum value of, for example, 10 volts as set by dimensioning the resistors correspondingly. Prior to this, the output of the fourth comparator with hysteresis 40 holds the outputs of the other comparators with hysteresis 10, 20, 30, and thus the input of the control circuitry 50 for the controllable switching element 2, at low potential so that the switching element 2 is in the off state preventing flow of armature current.

I claim:

1. A control circuit for controlling a load current fed from a DC power source to a DC motor, the armature winding of which is connected in parallel with a by-pass diode, comprising:
    a controllable switching element, means for connecting said controllable switching element between said DC power source and said DC motor;
    integrating means; comparator means with hysteresis that has first and second inputs and an output, means for applying a control voltage corresponding to the desired rotational speed of said DC motor to said first input of said comparator means, means connecting said integrating means to said second input of said comparator means, means connecting said output of said comparator means to said controllable switching element;
    an electronic switch, said electronic switch having a control terminal, means connecting said electronic switch to said integrating means; and
    means responsive to said output of said comparator for applying a control signal to said control terminal of said electronic switch such that said integrating means provides a DC voltage to said second input of the said comparator means only when said controllable switching element is in its conductive state.

2. A control circuit according to claim 1 wherein said controllable switching element is a transistor.

3. A control circuit according to claim 1 and further including two resistors connected in series across said controllable switching element and wherein said control terminal of said electronic switch is connected to the junction of said two resistors.

4. A control circuit according to claim 1 and further including an RC circuit and second comparator means with hysteresis that has a noninverting input, an inverting input and an output; means for applying a second control voltage to said noninverting input of said second comparator means, means connecting said RC circuit between said inverting input of said second comparator means and a load terminal of said controllable switching element; and means connecting said output of said second comparator means to said controllable switching element.

5. A control circuit according to claim 4 wherein said RC circuit comprises a resistor that has two leads and a capacitor that has two leads; means connecting one lead of said resistor to both said inverting input of said second comparator means and a first lead of said capacitor, means connecting the other lead of said resistor to a load terminal of said controllable switching element, and means for connecting the second lead of said capacitor to said DC power source.

6. A control circuit according to claim 4 and further including
    a voltage divider, means for connecting said voltage divider across said DC power source;
    third comparator means with hysteresis that has a noninverting input, an inverting input and an output; means connecting said noninverting input of said third comparator means to said voltage divider;
    a first diode that has its cathode connected to ground a resistor connected to said first diode, means connecting said inverting input of said third comparator means to the junction of said resistor and said first diode; and
    means including a second diode connecting said output of said third comparator means to the outputs of said first and second comparator means, such that in dependence on the resistances of said voltage divider the output of said third comparator switches from low to high when the voltage of the DC voltage source has reached a minimum value, thus enabling control of said controllable switching element.

7. A control circuit for controlling a load current fed from a DC power source to a DC motor, the armature winding of which is connected in parallel with a by-pass diode, comprising:
    a controllable switching element, means for connecting said controllable switching element between said DC power source and said DC motor;

integrating means; comparator means with hysteresis that has first and second inputs and an output, means for applying a control voltage corresponding to the desired rotational speed of said DC motor to said first input of said comparator means, means connecting said integrating means to said second input of said comparator means, means connecting said output of said comparator means to said controllable switching element;

an electronic switch, said electronic switch having a control terminal, means connecting said electronic switch to said integrating means;

means responsive to said output of said comparator means for applying a control signal to said control terminal of said electronic switch;

a voltage divider comprising two series-connected voltage dividing resistors; means for connecting said voltage divider in parallel with said DC power source;

means connecting said electronic switch in parallel with one of said voltage dividing resistors, and means connecting said integrating means to the junction of said two voltage dividing resistors.

8. A control circuit according to claim 7 and further including an RC circuit and second comparator means with hysteresis that has a noninverting input, an inverting input and an output; means for applying a second control voltage to said noninverting input of said second comparator means, means connecting said RC circuit between said inverting input of said second comparator means and a load terminal of said controllable switching element; and means connecting said output of said second comparator means to said controllable switching element.

9. A control circuit according to claim 8 wherein said RC circuit comprises a resistor that has two leads and a capacitor that has two leads; means connecting one lead of said resistor to both said inverting input of said second comparator means and a first lead of said capacitor, means connecting the other lead of said resistor to a load terminal of said controllable switching element, and means for connecting the second lead of said capacitor to said DC power source.

10. A control circuit for controlling a load current fed from a DC power source to a DC motor, the armature winding of which is connected in parallel with a by-pass diode, comprising:

a controllable switching element, means for connecting said controllable switching element between said DC power source and said DC motor;

integrating means; first comparator means with hysteresis that has first and second inputs and an output, means for applying a control voltage corresponding to the desired rotational speed of said DC motor to said first input of said first comparator means, means connecting said integrating means to said second input of said first comparator means, means connecting said output of said comparator means to said controllable switching element;

an electronic switch, said electronic switch having a control terminal, means connecting said electronic switch to said integrating means;

means responsive to said output of said first comparator means for applying a control signal to said control terminal of said electronic switch;

a voltage divider comprising two series-connected voltage dividing resistors, means for connecting said voltage divider in parallel with said DC power source, means connecting said electronic switch in parallel with one of said voltage dividing resistors, means connecting said integrating means to the junction of said two voltage dividing resistors, second comparator means with hysteresis that has a noninverting input, an inverting input and an output;

an NTC resistor;

a current detecting resistor connected in series with the armature winding of said DC motor and being in thermal contact with said NTC resistor;

third comparator means with hysteresis that has a noninverting input, an inverting input and an output; means connecting said noninverting input of said third comparator means to said NTC resistor, means connecting said inverting input of said third comparator means to a voltage divider connected to the terminals of said DC power source and means including a diode connecting said output of said third comparator means to the outputs of said first and second comparator means, such that when said current detecting resistor through which armature current flows is heated to a predetermined temperature, the output of the third comparator switches from high to low and turns said controllable switching element off.

11. A control circuit according to claim 10 and further including a voltage divider connected across said DC power source;

fourth comparator means with hysteresis that has a noninverting input, an inverting input and an output; means connecting said noninverting input of said fourth comparator means to said voltage divider;

means connecting said inverting input of said fourth comparator means to the junction of a resistor and a diode having its cathode connected to ground; and means including a second diode connecting said output of said fourth comparator means to the outputs of said first and second comparator means, such that in dependence on the resistances of said voltage divider the output switches from low to high when the voltage of the DC voltage source has reached a minimum value, thus enabling control of said controllable switching element.

* * * * *